United States Patent [19]

Krist et al.

[11] Patent Number: 5,064,733

[45] Date of Patent: Nov. 12, 1991

[54] ELECTROCHEMICAL CONVERSION OF $CO_2$ AND $CH_4$ TO $C_2$ HYDROCARBONS IN A SINGLE CELL

[75] Inventors: Kevin Krist, Palatine; Anthony F. Sammells, Naperville, both of Ill.

[73] Assignee: Gas Research Institute, Chicago, Ill.

[21] Appl. No.: 491,989

[22] Filed: Mar. 12, 1990

Related U.S. Application Data

[63] Continuation-in-part of Ser. No. 413,526, Sep. 27, 1989, Pat. No. 4,997,725.

[51] Int. Cl.$^5$ .............................. H01M 8/10
[52] U.S. Cl. .......................... 429/17; 429/33; 429/40; 429/19
[58] Field of Search ............... 429/13, 17, 30-33, 429/40, 41, 44, 45, 218, 193, 19; 427/115

[56] References Cited

U.S. PATENT DOCUMENTS

| | | | |
|---|---|---|---|
| 4,130,693 | 12/1978 | Van Den Berghe | 429/41 |
| 4,137,371 | 1/1979 | Blanchart et al. | 429/41 X |
| 4,459,341 | 7/1984 | Marchant et al. | 429/33 |

OTHER PUBLICATIONS

Bonanos, N., Ellis, B., and Mahmood, M. N., "Oxide Ion Conduction in Ytterbium-Doped Strontium Cerate," *Solid State Ionics*, 28-30 (1988), pp. 579-584.

Bonanos, N., Ellis, B., Knight, K. S., and Mahmood, M. N., "Ionic Conductivity of Gadolinium-Doped Barium Cerate Pervskites," *Solid State Ionics*, 35 (1989) pp. 179-188.

Cook, R. L., McDuff, R. C., and Sammells, A. F., "Electrochemical Reduction of Carbon Dioxide to Methane at High Current Densities," *J. Electrochem. Soc.*, 134 1873 (Jul. 1987).

Dewulf, D. W. and Bard, A. J., "The Electrochemical Reduction of $CO_2$ to $CH_4$ and $C_2H_4$ at Cu/NAFION Electrodes (Solid Polymer Electrolyte Structures)," *Cat. Lett.* 1, 73-80, (1988).

Frese, Jr., K. W. and Leach, S., "Electrochemical Reduction of Carbon Dioxide to Methane, Methanol, and CO on Ru Electrodes," *J. Electrochem. Soc.*, 132, 259 (1985).

*Handbook of Batteries and Fuel Cells*, Ed. David Linden, 43-26 to 43-33, published by McGraw-Hill Book Company(1984).

Hori, Y., Kikuchi, K., and Suzuki, S., "Production of CO and $CH_4$ in Electrochemical Reduction of $CO_2$ at Metal Electrodes in Aqueous Hydrogencarbonate Solution," *Chem Lett.*, 1695 (1985).

Hori, Y., Kikuchi K., Murata, A., and Suzuki, S., "Production of Methane and Ethylene in electrochemical Reduction of Carbon Dioxide at Copper Electrode in Aqueous Hydrogencarbonate Solution," *Chem. Lett.*, 897 (1986).

Hori, Y., Murata, A., Takahashi, R., and Suzuki, S., "Electro-reduction of CO to $CH_4$ and $C_2H_4$ at a Copper Electrode in Aqueous Solutions at Ambient Temperature and Pressure," *J. Am. Chem. Soc.*, 109, 5022 (1987).

Hori, Y., Murata, A., Takahashi, R., and Suzuki, S., "Electrochemical Reduction of Carbon Monoxide to Hydrocarbons at Various Metal Electrodes in Aqueous Solution," *Chem. Lett.*, 1665 (1987).

Hori, Y., Murata, A., Takahashi, R., and Suzuki S., "Enhanced Formation of Ethylene and Alcohols at Ambient Temperature and Pressure Electrochemical Reduction of Carbon Dioxide at a Copper Electrode," *J. Chem. Soc., Chem. Commun.*, 17, 1988.

(List continued on next page.)

*Primary Examiner*—Anthony Skapars
*Attorney, Agent, or Firm*—Speckman & Pauley

[57] ABSTRACT

A solid electrolyte electrochemical cell and process for concurrent gas phase electrocatalytic oxidative dimerization of methane at one side of the solid electrolyte and reduction of carbon dioxide to gaseous hydrocarbon products at the opposite side of the solid electrolyte. The electrochemical cell may use a solid electrolyte of an oxygen vacancy conducting type or a proton transferring type capable of transferring any proton mediating ion.

27 Claims, 1 Drawing Sheet

OTHER PUBLICATIONS

Iwahara, H., Uchida, H., and Yamasaki, I., "High-Temperature Steam Electrolysis Using $SrCeO_3$-Based Proton Conductive Solid Electrolyte," *Int. J. Hydrogen Energy*, vol. 12, No. 2, pp. 73–77.

Iwahara H., Uchida, H., Ono, K., and Ogaki, K., "Proton Conduction in Sintered Oxides Based on $BaCeO_3$," *J. Electrochem. Soc.*: Solid-State Science and Technology, pp. 529–533 (FEB. 1988).

Keller, G. E., and Bhasin, M. M., "Synthesis of Ethylene via Oxidative Coupling of Methane," *Journal of Catalysis*, 73, 9–19 (1982).

Lin, C., Campbell, K. D., Wang, J., and Lunsford, J. H., "Oxidative Dimerization of Methane over Lanthanum Oxide," *J. Phys. Chem.*, 90, 534–537 (1986).

Otsuka, K., Yokoyama, S., and Morikawa, A., "Catalytic Activity-and Selectivity-Control for Oxidative Coupling of Methane by Oxygen-Pumping through Yttria-Stabilized Zirconia," *Chemistry Letters*, The Chemical Society of Japan, 319–322 (1985).

Otsuka, K., Jinno, K., and Morikawa, A., "The Catalysts Active and Selective in Oxidative Coupling of Methane," *Chemistry Letters*, The Chemical Society of Japan, 499–500 (1985).

Osuka, K., Liu, Q., Hatano, M. and Morikawa, A., "Synthesis of Ethylene by Partial Oxidation of Methane over the Oxides of Transition Elements with LiCl," *Chemistry Letters*, The Chemical Society of Japan, 903–906 (1986).

Otsuka, K., Liu, Q., and Morikawa, A., "Selective Synthesis of Ethylene by Partial Oxidation of Methane over $LiCl-Sm_2O_3$," *J. Chem. Soc.*, Chem. Commun., 586–587 (1986).

Petrova, G. N., and Efimova, O. N., *Elektrokhimiya*, 19(7) 978 (1983).

Scherban, T., and Nowick, A. S., "Bulk Protonic Conduction in Yb-Doped $SrCeO_3$," *Solid State Ionics*, 35 (1989) pp. 189–194.

Seimanides, S. and Stoukides, M., "Electrochemical Modification of Ag-MgO Catalyst Electrodes during Methane Oxidation," *J. Electrochem. Soc.*, 1535–1536, Jul., 1986.

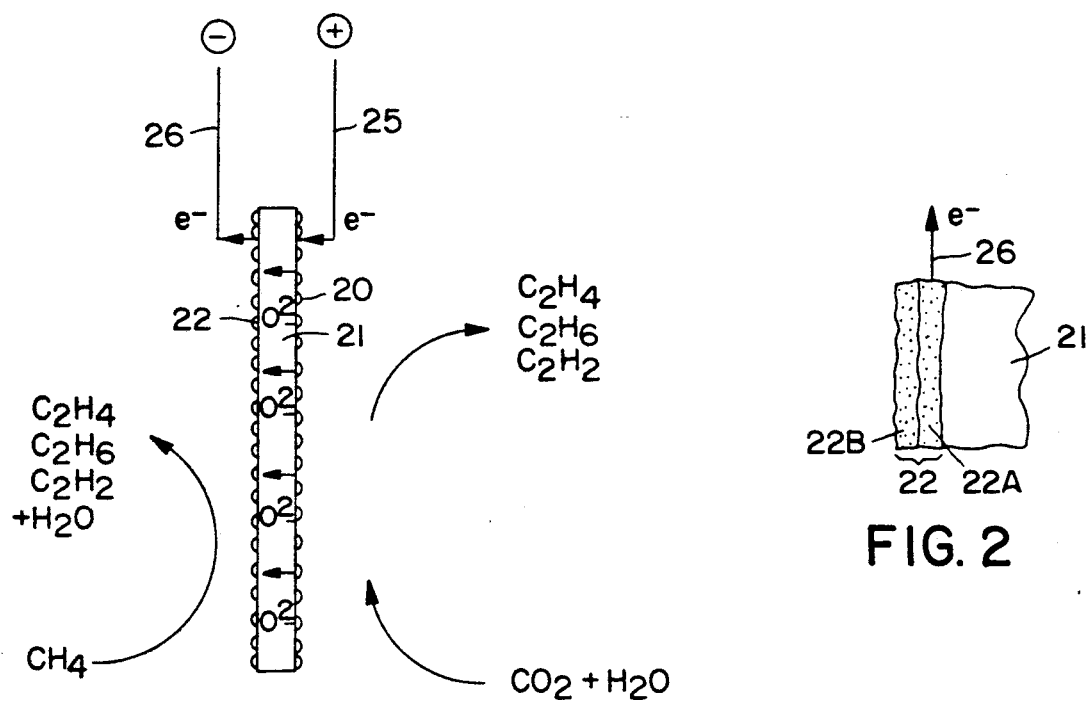
FIG. 1
FIG. 2
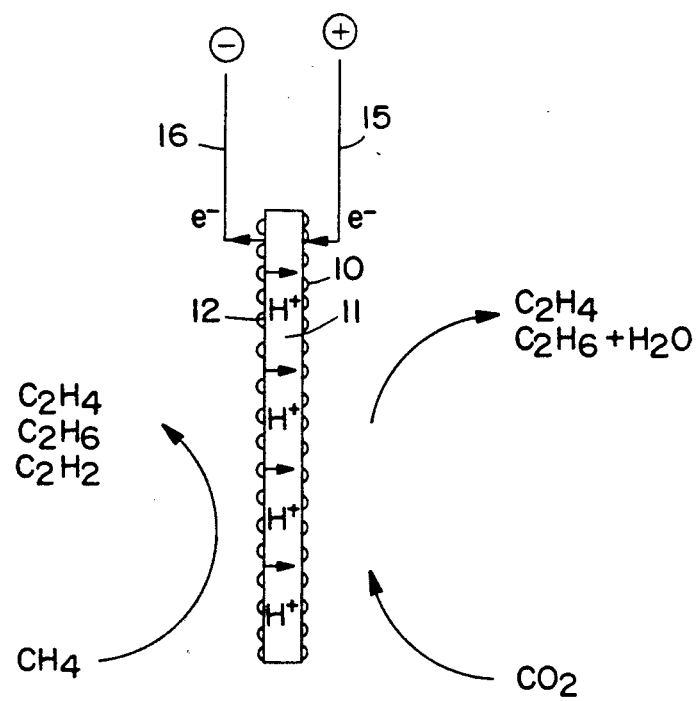
FIG. 3

ELECTROCHEMICAL CONVERSION OF $CO_2$ AND $CH_4$ TO $C_2$ HYDROCARBONS IN A SINGLE CELL

CROSS-REFERENCE TO RELATED APPLICATION

This application is a continuation-in-part application of co-pending application Ser. No. 07/413,526, filed Sept. 27, 1989 now U.S. Pat. No. 4,997,725.

BACKGROUND OF THE INVENTION

1. Field of the Invention

The solid electrolyte electrochemical cell of this invention provides concurrent gas phase electrocatalytic oxidative dimerization of methane at one side of the solid electrolyte and reduction of carbon dioxide to gaseous hydrocarbon products at the opposite side of the solid electrolyte. The electrochemical cell may use a solid electrolyte of an oxygen vacancy conducting type or a proton transferring type capable of transferring any proton mediating ion. The process of this invention uses a solid electrolyte electrochemical cell to produce $C_2$ hydrocarbon species on each side of the electrolyte concurrently by gas phase reaction, using methane reactant on the anode side and carbon dioxide reactant on the cathode side.

2. Description of the Prior Art

The complete electrochemical oxidation of methane to $CO_2$ and $H_2O$ in the anode compartment of a solid oxide fuel cell, after its initial steam reformation to hydrogen, has been used in the conversion of natural gas into DC electricity, *Handbook of Batteries and Fuel Cells*, Ed. David Linden, 43-26 to 43-33, published by McGraw-Hill Book Company (1984).

The chemical synthesis of ethylene by oxidative coupling of methane using Sn, Pb, Sb, Bi, Tl, Cd, and Mn oxide catalysts is taught by Keller, G. E., and Bhasin, M. M., "Synthesis of Ethylene via Oxidative Coupling of Methane," *Journal of Catalysis*, 73, 9-19 (1982). However, the Keller, et al. article teaches Li, Mg, Zn, Ti, Zr, Mo, Fe, Cr, W, Cu, Ag, Pt, Ce, V, B, and Al oxides to have little or no such catalytic activity. The chemical synthesis of ethylene directly from methane in the presence of oxygen over LiCladded transition metal oxide catalysts providing high selectivity and yield is taught by Otsuka, K., Liu, Q., Hatano, M. and Morikawa, A., "Synthesis of Ethylene by Partial Oxidation of Methane over the Oxides of Transition Elements with LiCl", *Chemistry Letters*, The Chemical Society of Japan, 903-906 (1986). Chemical partial oxidation of methane over $LiCl-Sm_2O_3$ catalyst to $C_2$ products, ethylene and ethane, with a high ethylene selectivity is taught by Otsuka, K., Liu, Q., and Morikawa, A., "Selective Synthesis of Ethylene by Partial Oxidation of Methane over $LiCl-Sm_2O_3$" *J. Chem. Soc.*, Chem. Commun., 586-587 (1986). Chemical conversion of methane to ethane and ethylene under oxygen limiting conditions over $La_2O_3$ is taught by Lin, C., Campbell, K. D., Wang, J., and Lunsford, J. H., "Oxidative Dimerization of Methane over Lanthanum Oxide," *J. Phys. Chem.*, 90, 534-537 (1986).

Oxidative coupling of methane over Ag and $Bi_2O_3$-Ag catalysts was carried out with oxygen electrochemically pumped through yttria-stabilized zirconia and it was found that the oxygen pumped to the $Bi_2O_3$-Ag catalyst showed higher catalytic activity and selectivity for the production of $C_2$ compounds compared to surface oxygen from the gas phase, Otsuka, K., Yokoyama, S., and Morikawa, A., "Catalytic Activity - and Selectivity - Control for Oxidative Coupling of Methane by Oxygen-Pumping through Yttria-Stabilized Zirconia," *Chemistry Letters*, The Chemical of Japan, 319-322 (1985). Electrochemical driving of $O^2$ species through solid electrolyte yttria-stabilized zirconia decreased selectivity to $C_2$ hydrocarbons and decreases the rate of production of $C_2H_4$ using an Ag-Li/MgO catalyst electrode, Seimanides, S. and Stoukides, M., "Electrochemical Modification of Ag-MgO Catalyst Electrodes during Methane Oxidation," *J. Electrochem. Soc.*, 1535-1536, July, 1986. Rare earth metal oxides $Sm_2O_3$, $Ho_2O_3$, $Gd_2O_3$, $Er_2O_3$, $Tm_2O_3$, $Yb_2O_3$, $Y_2O_3$, and $Bi_2O_3$ have been shown to have good catalytic activity and selectivity in chemical oxidative coupling of methane, $Sm_2O_3$ being the most active and selective catalyst in the formation of $C_2$ compounds, Otsuka, K., Jinno, K., and Morikawa, A., "The Catalysts Active and Selective in Oxidative Coupling of Methane," *Chemistry Letters*, The Chemical Society of Japan, 499-500 (1985).

Indirect reduction of $CO_2$ on a mercury electrode in an aqueous electrolyte, pH 7, containing $TiCl_3$, $Na_2MoO_4$ and pyrocatechol where the total Faradaic efficiency for cathodic hydrocarbon generation was about 0.2 percent at $7mA/cm^2$, with methane being the major hydrocarbon component, is taught by Petrova, G. N. and Efimova, O. N., *Elektrokhimiva*, 19(7), 978 (1983). $CO_2$ has been shown to be reducible to $CH_4$, CO, and methanol at ruthenium cathodes in $CO_2$ saturated aqueous $Na_2/SO_4$ electrolyte with Faradaic efficiencies for $CH_4$ production up to 42 percent at current densities up $0.11mA/cm^2$ by Frese, Jr., K. W. and Leach, S., "Electrochemical Reduction of Carbon Dioxide to Methane, Methanol, and CO on Ru Electrodes," *J. Electrochem. Soc.*, 132, 259 (1985).

Copper, 99.99 percent pure, was used as a cathode with 0.5 M $KHCO_3$ electrolyte for the electrochemical reduction of $CO_2$ at ambient temperature and current density of 5.0 $mA/cm^2$ for 30 to 60 minutes with Faradaic efficiencies for $CH_4$ of 37 to 40 percent, Hori, Y., Kikuchi, K., and Suzuki, S., "Production of CO and $CH_4$ in Electrochemical Reduction of $CO_2$ at Metal Electrodes in Aqueous Hydrogencarbonate Solution," *Chem. Lett.*, 1695 (1985). In later work high purity copper cathodes, 99.999 percent, were used for the electrochemical reduction of $CO_2$ in 0.5M $KHCO_3$ electrolyte in a cell operated at a current of $5mA/cm^2$ for 30 minutes at temperatures of 0° C. and 40° C. shows Faradaic efficiency for production of $CH_4$ drops from 60 percent at 0° to 5 percent at 40,°; $C_2H_4$ increases from 3 percent at 0° to 18 percent at 40°; while hydrogen production increases from 20 percent at 0° to 45 percent at 40°. It is stated that 99.99 percent pure copper cut the Faradaic efficiencies to about one-third of those obtained with 99.999 percent pure copper, Hori, Y., Kikuchi, K., Murata, A., and Suzuki, S., "Production of Methane and Ethylene in Electrochemical Reduction of Carbon Dioxide at Copper Electrode in Aqueous Hydrogencarbonate Solution," *Chem. Lett.*, 897 (1986). Later work of electrochemical reduction of $CO_2$ at a 99.999 percent pure copper cathode in aqueous electrolytes of KCl, $KClO_4$, and $K_2SO_4$ at 19° C. and current density of $5mA/cm^2$ showed Faradaic yields of $C_2H_4$ of as high as in the order of 48 percent, $CH_4$ 12 percent and EtOH 21 percent, Hori, Y., Murata, A., Takahashi, R., and Suzuki, S., "Enhanced Formation of Ethylene and Alcohols at Ambient Temperature and Pressure Electrochemical Reduction of Carbon Dioxide at a Copper Electrode," *J. Chem. Soc.*, Chem. Commun, 17, 1988.

Electroreduction of CO at a 99.999 percent pure copper cathode in an aqueous catholyte of $KHCO_3$ at ambient temperature for 30 minutes showed hydrogen the predominant product and at $1.0 mA/cm^2$ $C_2H_4$ Faradaic production was 22 percent, $CH_4$ 1 percent; $2.5 mA/cm^2$ $C_2H_4$ Faradaic production was 21 percent, $CH_4$ 16 percent and at $5.0 mA/cm^2$ $C_2H_4$ Faradaic production was 16 percent, $CH_4$ 6 percent, Hori, Y., Murata, A., Takahashi, R., and Suzuki, S., "Electroreduction of CO to $CH_4$ and $C_2H_4$ at a Copper Electrode in Aqueous Solutions at Ambient Temperature and Pressure," *J. Am. Chem. Soc.*, 109. 5022 (1987). Similar work by the same authors showed electroreduction of CO at a 99.999 percent pure copper cathode in an aqueous 0.1 M $KHCO_3$ pH 9.6 catholyte at 19° C. at $2.5 mA/cm^2$ resulted in Faradaic production $C_2H_4$ of 21.2 percent; $CH_4$ of 16.3 percent; EtOH of 10.9 percent; and 45.5 percent $H_2$, Hori, Y., Murata, A., Takahashi, R., and Suzuki, S., "Electrochemical Reduction of Carbon Monoxide to Hydrocarbons at Various Metal Electrodes in Aqueous Solution," *Chem. Lett.*, 1665 (1987).

In the reduction of $CO_2$ to $CH_4$ using 99.9 percent pure cold rolled B 370 copper cathodes with a $CO_2$ saturated 0.5M $KHCO_3$ electrolyte, Faradaic efficiencies of 33 percent were achieved for $CH_4$ at current densities up to 38 $mA/cm^2$ with no $C_2H_4$ being detected, Cook, R. L., McDuff, R. C., and Sammells, A. F., "Electrochemical Reduction of Carbon Dioxide to Methane at High Current Densities," *J. Electrochem. Soc.*. 134, 1873 (1987).

Electrochemical reduction of $CO_2$ to $CH_4$ and $C_2H_4$ was shown to occur at copper/Nafion electrodes (solid polymer electrolyte structures) at Faradaic efficiencies of about 9 percent for each $CH_4$ at $E = -200V$ vs. SCE using 2mM $H_2SO_4$ counter solution at a temperature of 22° C., Dewulf, D. W. and Bard, A. J., "The Electrochemical Reduction of $CO_2$ to $CH_4$ and $C_2H_4$ at Cu/NAFION Electrodes (Solid Polymer Electrolyte Structures)," *Cat. Lett.* 1, 73–80, (1988).

SUMMARY OF THE INVENTION

U.S. Pat. application Ser. No. 07/413,526, filed Sept. 27, 1989, a parent to this application and owned by the same assignee as this application, teaches a solid oxide fuel cell having a metallic oxide oxygen reducing electronic and oxygen vacancy conducting perovskite cathode adjacent one side of an oxygen vacancy conducting solid electrolyte having high $O^2$ conductivity at cell operating temperatures and a metallic oxide $O^2$ conducting perovskite layer anode contacting the other side of the solid electrolyte with a rare earth metallic oxide layer contacting the opposite side of the anode metallic oxide perovskite layer and capable of dimerizing methane to predominantly $C_2$ products. The solid oxide fuel cell is used for concurrent production of DC current and the electrocatalytic oxidative dimerization of methane by passing oxygen containing gas in contact with one side of the metallic oxide oxygen reducing electronic and oxygen vacancy conducting perovskite cathode forming $O^{2-}$, passing the formed $O^{2-}$ to and through an oxygen vacancy conducting solid electrolyte to an anode contacting the other side of the solid electrolyte, passing the $O^{2-}$ from the solid electrolyte into an anode having a metallic oxide $O^{22-}$ conducting perovskite anode layer in contact with the electrolyte on one side and having a rare earth metallic oxide anode layer in contact with the metal oxide anode layer on the other side and in contact with methane containing gas on its other side, oxidatively dimerizing $CH_4$ to $C_2$ species and forming e. in the anode. U.S. Pat. application Ser. No. 07/413,526, filed Sept. 27, 1989 is incorporated herein by reference in its entirety.

The solid electrolyte electrochemical cell of the present invention provides concurrent gas phase electrocatalytic oxidative dimerization of methane at an anode on one side of a solid electrolyte and reduction of carbon dioxide to gaseous hydrocarbon products at a cathode on the opposite side of the solid electrolyte. The anode comprises a rare earth metallic oxide anode layer in contact with one side of an ionic and electronic conducting metallic oxide perovskite anode layer in contact with one side of a solid electrolyte on its opposite side, the anode catalytically oxidatively dimerizing the methane to $C_2$ species. Means are provided for passing methane containing gas in contact with the rare earth metallic oxide anode layer. The cathode comprises an ionic and electronic conducting metal cathode electrocatalyst capable of providing adsorption sites for carbon dioxide and chemisorbed and Faradaically generated hydrogen species in proximity to the adsorbed carbon dioxide and capable of catalytic reduction of the carbon dioxide to predominantly $C_2$ species. Means are provided for passing carbon dioxide containing gas in contact with one side of the cathode. Means are provided for withdrawing the $C_2$ species from the region of both the anode and the cathode. The solid electrolyte suitable for use in the electrochemical cell of this invention may be an oxygen vacancy conducting electrolyte having high $O^{2-}$ conductivity at cell operating temperatures or an electrolyte capable of transferring any proton mediating ion at cell operating temperatures from one side to the opposite side of the electrolyte. Such electrolytes include those of the proton mediation type where protons may be transferred by passage through the electrolyte in a form other than $H^+$, such as OH, and those of the direct proton conductance type where protons are conducted through the electrolyte in the $H^+$ form.

This invention provides a process for concurrent gas phase electrocatalytic oxidative dimerization of methane at the anode on one side of a solid electrolyte and reduction of carbon dioxide to gaseous hydrocarbons at a cathode on the other side of the solid electrolyte. The process comprises passing methane containing gas in contact with a rare earth metallic oxide anode layer of an anode comprising a rare earth metallic oxide anode layer in contact with one side of an ionic and electronic conducting metallic oxide perovskite anode layer in contact with one side of a solid electrolyte on its opposite side, the anode catalytically oxidatively dimerizing the methane to $C_2$ species; transferring through the solid electrolyte an ionic species selected from the group consisting of an $O^{2-}$ species from the cathode to the anode and a proton mediating ion from the anode to the cathode at cell operating temperatures; passing carbon dioxide containing gas in contact with one side of an ionic and electronic conducting metal cathode electrocatalyst capable of providing adsorption sites for carbon dioxide and chemisorbed and Faradaically generated hydrogen species in proximity to the adsorbed carbon dioxide and capable of catalytic reduction of the carbon dioxide to predominantly $C_2$ species; and withdrawing the produced $C_2$ species from the region of the anode and the cathode.

In one embodiment, the process of this invention for concurrent gas phase electrocatalytic oxidative dimerization of methane at the anode and reduction of carbon dioxide to gaseous hydrocarbons at a cathode comprises: passing carbon dioxide containing gas and water in contact with one side of a cathode selected from the group consisting of a rare earth metallic oxide cathode layer in contact on its inner side with an electronic and oxygen vacancy conducting perovskite cathode layer in contact with the solid electrolyte, copper, and copper alloy catalytically forming $O^{2-}$ and $C_2$ species. The formed $O^{2-}$ is passed to and through an oxygen vacancy conducting solid electrolyte having high $O^{2-}$ conductivity at cell operating temperatures to an anode contacting the other side of the solid electrolyte. The $O^{2-}$ is passed from the solid electrolyte into an anode comprising a metallic oxide electronic and oxygen vacancy conducting perovskite anode layer in contact with the electrolyte on one side and having a rare earth metallic oxide perovskite anode layer in contact with the metallic oxide anode layer on the other side. The methane containing gas is passed in contact with the anode catalytically oxidatively dimerizing the methane to $C_2$ species and the $C_2$ species is withdrawn from the region of both the cathode and the anode.

In another embodiment, the process of this invention for concurrent gas phase electrocatalytic oxidative dimerization of methane at the anode and reduction of carbon dioxide to gaseous hydrocarbons at a cathode comprises: passing methane containing gas in contact with one side of a rare earth metallic oxide anode layer in contact on its other side with one side of an electronic conducting and proton mediating metallic oxide perovskite anode layer in contact with one side of a solid electrolyte on its opposite side catalytically oxidatively dimerizing the methane to $C_2$ species and forming proton mediating ions. The formed proton mediating ions are transferred to and through a proton mediating solid electrolyte to a cathode contacting the other side of said solid electrolyte. Carbon dioxide containing gas is passed in contact with one side of an electronic conducting and proton mediating metallic cathode selected from the group consisting of a rare earth metallic oxide cathode layer in contact on its inner side with an electronic and ionic conducting perovskite cathode layer in contact with the solid electrolyte, the perovskite having copper partially substituted into lattice sites, copper, and copper alloys catalytically reducing the carbon dioxide to $C_2$ species. The formed $C_2$ species is withdrawn from the region of both the cathode and the anode.

BRIEF DESCRIPTION OF THE DRAWING

The above and further advantages of this invention will be seen in reading of the description of preferred embodiments together with reference to the drawing wherein:

FIG. 1 is a schematic representation of a solid electrolyte electrochemical cell according to an embodiment of this invention having an oxygen vacancy conducting electrolyte;

FIG. 2 is an enlarged schematic representation of a cross-section of a portion of the anode shown in the electrochemical cell of FIG. 1; and FIG. 3 is a schematic representation of a solid electrolyte electrochemic 1 cell according to another embodiment of this invention having a proton transferring electrolyte.

DESCRIPTION OF PREFERRED EMBODIMENTS

As shown schematically in FIGS. 1 and 2, the oxygen vacancy conducting electrochemical cell has a metallic oxide carbon dioxide reducing electronic and oxygen vacancy conducting perovskite, copper, or copper alloy side of cathode 20 contacting oxygen vacancy conducting solid electrolyte 21 through the cathode/electrolyte interface. The opposite side of cathode 20 is in contact with a cathode compartment for contact with a carbon dioxide containing gas and water, in the form of steam, and may suitably be a rare earth metallic oxide on the above perovskite, copper, or copper alloy. Means for supply of the carbon dioxide and steam containing gas and removal of formed $C_2$ products and configuration of the cathode compartment are not shown since any such means is suitable and well-known to the art. The carbon dioxide and water is converted to $O^{2-}$ and $C_2$ species in cathode 20 according to the cathodic reaction:

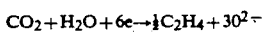

The $O^{2-}$ is passed to and through oxygen vacancy conducting solid electrolyte 21 having high $O^{2-}$ conductivity at cell operating temperatures to the anode/electrolyte interface. As shown in FIG. 2, anode 22 has electronic conducting and $O^{2-}$ conducting metallic oxide perovskite anode layer 22A in contact through the anode/electrolyte interface with electrolyte 21 on one side and on the opposite side with rare earth metallic oxide anode layer 22B. Rare earth metallic oxide anode layer 22B is contacted with methane containing gas. The configuration and operation of the anode compartment is not described herein since any suitable means known to the art for contacting the outer surface of anode 22 with methane containing gas and removing formed products from the anode compartment is suitable in the solid electrolyte cell and process of this invention. Oxygen vacancies, $O^{2-}$, pass from solid electrolyte 21 to anode layer 22A to achieve a population of $O^2$ for conversion to O at the active sites. The $O^{2-}$ oxidation occurs with rare earth $O^{2-}$ sites being formed at the metallic oxide perovskite anode layer/rare earth metallic oxide anode layer interfacial region providing rare earth $O^{2-}$ sites for partial methane oxidation to $C_2$ species comprising predominantly $C_2H_4$ in rare earth metallic oxide anode layer 22B according to the anodic reaction:

A suitable current collector and external lead is provided for cathode 20 and anode 22, shown as 25 and 26, respectively, to provide electronic balance and current to the electrochemical cell.

Anode 22 has metallic oxide electronic and $O^{2-}$ conducting perovskite layer 22A contacting solid electrolyte 21 at the anode/electrolyte interface. Anode perovskite layer 22A may comprise the following perovskite-type materials having the general formula $AMO_3$ where A is La or Pr, M is Co, Ni, or Mn, and 0 is oxygen; compounds having the general formula $La_{1-x}Ma_xMbO_3$ where La is lanthanum, Ma is Sr, Ca, K, or Pr, Mb is Cr, Mn, Fe, Co, or Ba, x is a number about 0.01 to about 0.2, and O is oxygen; compounds having the general formula $LaMcO_3$ where La is lanthanum, Mc is Ni, Co, Mn, Fe, or V, and 0 is oxygen; and platinum. Preferred anode perovskite materials are $La_{0.90}Sr_{0.10}MnO_3$ and $La_{0.70}Sr_{0.30}MnO_3$. Rare earth metallic oxide layer 22B contacts the opposite side of anode metallic oxide perovskite layer 22A at the metallic oxide perovskite/rare earth metallic earth oxide interface. Suitable rare earth metallic oxides for use in anode layer 22B include: $Sm_2O_3$, $Dy_2O_3$, $Ho_2O_3$, $Yb_2O_3$ $Nd_2O_3$, $Eu_2O_3$, $Er_2O_3$, $Lu_2O_3$, $Gd_2O_3$, $Tm_2O_3$, preferably $Sm_2O_3$ or $Dy_2O_3$. A preferred anode rare earth metallic oxide is $Sm_2O_3$.

Suitable oxygen vacancy conducting electrolyte 21 may comprise the following compounds: Binary $ZrO_2$ based materials having the general formulas $Zr_{1-x}M^{2+}O_{2-x}$ and $Zr_{1-x}M^{3+}O_{2-x/x}$, and ternary $ZrO_2$ based material such as $ZrO-Y_2O_3-Ta_2O_5$, $ZrO_2-Yb_2O_3-MO_2$, and the like, where M is Ca, Mg, Y, La, Nd, Sm, Gd, Yb, Lu, Sc, Ho, and other materials having similar physical and chemical properties, and M comprises from about 5 m/o to about 20 m/o; and $ThO_2$ based materials having the general formulas $Th_{1-x}M^{2+}O_{2-x}$ and $Th_{1-x}M^{3+}O_{2-x/2}$, where M is Ca, Y, Yb, Gd, La, and other materials having similar physical and chemical properties, and M comprises about 5 m/o to 25 m/o. Some suitable oxygen vacancy conducting solid electrolytes and their conductivities are as follows:

| | Conductivity (ohm$^{-1}$cm$^{-1}$) | Measurement Temp. T °C. |
|---|---|---|
| $ZrO_2$ (15 m/o CaO) | $2.4 \times 10^{-2}$ | 1000 |
| $ZrO_2$ (8 m/o $Y_2O_3$) | $5.6 \times 10^{-2}$ | 1000 |
| $ZrO_2$ (15-20 m/o MgO) | $(2-4) \times 10^{-2}$ | 1000 |
| $ZrO_2$ (5-15 m/o $La_2O_3$) | $(2.5-4) \times 10^{-3}$ | 1000 |
| $ZrO_2$ (15 m/o $Nd_2O_3$) | $(1.4-3.8) \times 10^{-2}$ | 1000 |
| $ZrO_2$ (10 m/o $Sm_2O_3$) | $5.8 \times 10^{-2}$ | 1000 |
| $ZrO_2$ (10 m/o $Gd_2O_3$) | $1.1 \times 10^{-1}$ | 1000 |
| $ZrO_2$ (9 m/o $Yb_2O_3$) | $1.5 \times 10^{-2}$ | 1000 |
| $ZrO_2$ (15 m/o $Lu_2O_3$) | $1.2 \times 10^{-2}$ | 1000 |
| $ZrO_2$ (10 m/o $Sc_2O_3$) | $2.4 \times 10^{-1}$ | 1000 |
| $ZrO_2$ (12.7 m/o $Ho_2O_3$) | $3.5 \times 10^{-2}$ | 880 |
| $ThO_2$ (7 m/o CaO) | $2 \times 10^{-3}$ | 1000 |
| $ThO_2$ (15 m/o $YO_{1.5}$) | $6.3 \times 10^{-3}$ | 1000 |

A preferred electrolyte is $ZrO_2(8m/oY_2O_3)$.

Cathode 20 may comprise copper, copper alloys such as of ferrous metals, the same type of rare earth metallic oxide layer 22B on metallic oxide perovskite layer 22A as set forth above for anode 22 and the same type of metallic oxide perovskite materials as set forth for layer 22A with copper introduced into a perovskite site. The perovskite material and the rare earth material of the cathode may be the same as or different from the corresponding materials used for the anode. Preferred cathode materials are copper and copper alloy.

FIG. 3 schematically illustrates an electrochemical cell according to another embodiment of this invention wherein the solid electrolyte is capable of transferring any proton mediating ion, shown schematically in FIG. 3 as H$^+$ transfer, from the anode side to the cathode side of the electrolyte. The electrochemical cell has anode 12 which may be of the same electronic conducting and proton mediating ion conducting metallic oxide perovskite anode layer in contact through the anode/electrolyte interface with electrolyte 11 on one side and on the opposite side a rare earth metallic oxide anode layer, as described above with respect to FIG. 2. The rare earth metallic oxide anode layer is contacted with methane containing gas for conversion to C$_2$ species and protons. The methane is converted to C$_2$ species according to the anode reaction:

$$2CH_4 \rightarrow C_2H_4 + 4H^{3O} + 4e$$

Proton transferring electrolytes may include those of the proton mediation type where protons may be transferred by passage through the electrolyte in the form of any proton mediating ion, such as OH, and those of the direct proton conductance type where protons are conducted through the electrolyte in the H$^+$ form. Cathode 10 contacts proton transfer electrolyte 11 on one side and is in contact on its other side with a cathode compartment for contact with carbon dioxide containing gas. The carbon dioxide is converted to C$_2$ species at the cathode 10 according to the cathodic reaction:

$$CO_2 + 7H^+ + 7e \rightarrow \tfrac{1}{2}C_2H_6 + 2H_2O$$

A suitable current collector and external lead is provided for cathode 10 and anode 22, shown as 15 and 16, respectively, to provide electronic balance and current to the electrochemical cell.

Suitable proton mediation solid electrolytes include perovskite structured ceramic materials; BaCeO$_3$ materials doped with Yb, Y, Gd, Nd, La or Ca, such as Yb-doped BaCeO$_3$ as described by Iwahara, H., Uchida, H., and Yamasaki, I., "High-Temperature Steam Electrolysis Using SrCeC$_3$-Based Proton Conductive Solid Electrolyte," Int. J. Hvdrooen Enerqv, Vol. 12, No. 2, pp. 73-77 (1987), or Gd-doped BaCeO$_3$ as described in Iwahara, H., Uchida, H., Ono, K., and Ogaki, K., "Proton Conduction in Sintered Oxides Based on BaCeO$_3$," J. Electrochem. Soc.: Solid-State Science and Technology, p. 529-533 (February, 1988), and Bonanos, N., Ellis, B., Knight, K. S., and Mahmood, M. N., "Ionic Conductivity of Gadolinium-Doped Barium Cerate Perovskites," Solid State Ionics, 35 (1989) pp. 179-188; materials such as SrCeO$_3$ doped with Yb$^{3+}$, as described by Scherban, T. and Nowick, A. S., "Bulk Protonic Conduction in Yb-Doped SrCeO$_3$," Solid State Ionics, 35 (1989) pp. 189-194, or Yb-doped SrCeO$_3$ as described by Bonanos, N., Ellis, B., and Mahmood, M.N., "Oxide Ion Conduction in Ytterbium-Doped Strontium Cerate," Solid State Ionics, 28-30 (1988) pp. 579-584; and perovskite structured KTaO$_3$ crystals.

The cathode metal electrocatalyst 10 may comprise a metal electrocatalyst capable of providing adsorption sites for CO$_2$ and chemisorbed hydrogen species and faradaically generated hydrogen species in proximity to adsorbed CO$_2$ and may include metals selected from the group consisting of copper, copper alloys, such as iron alloys, and AMO$_3$ perovskite materials as described above with partial substitution of copper into M lattice sites. Copper is a preferred cathode metal electrocatalyst for use in this invention.

In the electrochemical cells of this invention the electrodes preferably comprise a thin electrode layer deposited on the surface of the ionic conducting solid electrolyte. Suitable thin electrode layers may be provided by techniques such as plasma spraying or slurry coating followed by sintering as well known in the art.

Suitable loading of the metal electrocatalyst anode and cathode on the ionic conducting solid electrolyte is about 0.01 to about 1 mg/cm$^2$, about 0.05 to about 0.2 mg/cm$^2$ being preferred.

Any suitable carbon dioxide and water vapor or carbon dioxide containing gas, as required, may be provided to the cathode for formation of $C_2$ species. Likewise, any methane containing gas, such as natural gas, synthetic natural gas, solid or liquid hydrocarbon gasification products containing methane, or methane enriched gases may be supplied to the anode for dimerization. Means for provision of gases to, removal of gases from, and configuration of anode and cathode compartments are well known to those skilled in the art. One preferred solid electrolyte cell of this invention has a generally tubular configuration of the solid electrolyte within an outer tubular container to form gas compartments on each side of the solid electrolyte.

Suitable operating temperatures for the electrochemical cells according to this invention are about 600° to about 1020° C. The oxygen vacancy conducting cells preferably operate at about 750° to about 800° C. and the proton mediating cells at about 800° to about 1020° C.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A process for concurrent gas phase electrocatalytic oxidative dimerization of methane at the anode on one side of a solid electrolyte and reduction of carbon dioxide to gaseous hydrocarbons at a cathode on the other side of said solid electrolyte, said process comprising:

passing methane containing gas in contact with a rare earth metallic oxide anode layer of an anode comprising a rare earth metallic oxide anode layer in contact with one side of an ionic and electronic conducting metallic oxide perovskite anode layer in contact with one side of a solid electrolyte on its opposite side, said anode catalytically oxidatively dimerizing said methane to $C_2$ species;

transferring through said solid electrolyte an ionic species selected from the group consisting of an $O^{2-}$ species from said cathode to said anode and a proton mediating ion from said anode to said cathode at cell operating temperatures;

passing carbon dioxide containing gas in contact with one side of an ionic and electronic conducting metal cathode electrocatalyst capable of providing adsorption sites for carbon dioxide and chemisorbed and faradaically generated hydrogen species in proximity to said adsorbed carbon dioxide and capable of catalytic reduction of said carbon dioxide to predominantly $C_2$ species; and withdrawing said $C_2$ species from the region of said anode and said cathode.

2. A process according to claim 1 wherein the loading of metal electrocatalyst anode and cathode on said electrolyte is about 0.01 to about 1 mg/cm$^2$.

3. A process according to claim 1 wherein said process is carried out at about 600° to about 1020° C.

4. A process for concurrent gas phase electrocatalytic oxidative dimerization of methane at the anode on one side of a solid electrolyte and reduction of carbon dioxide to gaseous hydrocarbons at a cathode on the other side of said solid electrolyte, said process comprising:

passing carbon dioxide containing gas and water in contact with one side of a cathode selected from the group consisting of a rare earth metallic oxide cathode layer in contact on its inner side with an electronic and oxygen vacancy conducting perovskite cathode layer in contact with said solid electrolyte, copper, and copper alloy catalytically forming $O^{2-}$ and $C_2$ species;

passing formed $O^{2-}$ to and through an oxygen vacancy conducting solid electrolyte having high $O^{2-}$ conductivity at cell operating temperatures to an anode contacting the other side of said solid electrolyte;

passing $O^{2-}$ from said solid electrolyte into an anode comprising a metallic oxide electronic and oxygen vacancy conducting perovskite anode layer in contact with said electrolyte on one side and in contact with a metallic oxide anode layer on the other side;

passing methane containing gas in contact with said anode catalytically oxidatively dimerizing said methane to $C_2$ species; and withdrawing said $C_2$ species from the region of said cathode and said anode.

5. A process according to claim 4 wherein said cathode is selected from the group consisting of copper and copper alloy.

6. A process according to claim 4 wherein said cathode comprises a rare earth metallic oxide cathode layer and an electronic and oxygen vacancy conducting perovskite cathode layer, said rare earth metallic oxide selected from the group consisting of $Sm_2O_3$, $Dy_2O_3$, $Ho_2O_3$, $Yb_2O_3$, $Nd_2O_3$, $Eu_2O_3$, $Er_2O_3$, $Lu_2O_3$, $Gd_2O_3$, and $Tm_2O_3$, and said perovskite cathode layer selected from the group consisting of compounds having the general formula $AMO_3$ where A is selected from the group consisting of La and Pr, M is selected from the group consisting of Co, Ni, and Mn, and O is oxygen; compounds having the general formula $La_{1-x}Ma_xMbO_3$ where La is lanthanum, Ma is selected from the group consisting of Sr, Ca, K, and Pr, Mb is selected from the group consisting of Cr, Mn, Fe, Co, and Ba, x is a number about 0.01 to about 0.2, and O is oxygen; compounds having the general formula $LaMcO_3$ where La is lanthanum, Mc is selected from the group consisting of Ni, Co, Mn, Fe, and V, and O is oxygen; and the above metallic oxide perovskite materials with copper introduced into a perovskite site.

7. A process according to claim 4 wherein said electrolyte is selected from the group consisting of binary $ZrO_2$ based materials having the general formulas $Zr_{1-x}M^{2+}O_{2-x}$ and $Zr_{1-x}M^{3+}O_{2-x/2}$, and ternary $ZrO_2$ based materials $ZrO-Y_2O_3-Ta_2O_5$, $ZrO_2-Yb_2O_3-MO_2$, where M is selected from the group consisting of Ca, Mg, Y, La, Nd, Sm, Gd, Yb, Lu, Sc, and Ho, and M comprises from about 5 m/o to about 20 m/o; and $ThO_2$ based materials having the general formulas $Th_{1-x}M^{2+}O_{2-x}$ and $TH_{1-x}M^{3+}O_{2-x/2}$, where M is selected from the group consisting of Ca, Y, Yb, Gd, and La, and M comprises about 5 m/o to 25 m/o.

8. A process according to claim 4 wherein said metallic oxide anode layer is selected from the group consisting of $Sm_2O_3$, $Dy_2O_3$, $Ho_2O_3$, $Yb_2O_3$, $Nd_2O_3$, $Eu_2O_3$, $Er_2O_3$, $Lu_2O_3$, $Gd_2O_3$, and $Tm_2O_3$, and said perovskite anode layer is selected from the group consisting of having the general formula $AMO_3$ where A is selected from the group consisting of La and Pr, M is selected from the group consisting of Co, Ni, and Mn, and O is oxygen; compounds having the general formula $La_{1-x}Ma_xMbO_3$ where La is lanthanum, Ma is selected from the group consisting of Sr, Ca, K, and Pr, Mb is selected from the group consisting of Cr, Mn, Fe, Co, and Ba, x is a number about 0.01 to about 0.2, and O is oxygen; compounds having the general formula LaMcC$_3$ where La is lanthanum, Mc is selected from the group consisting of Ni, Co, Mn, Fe, and V, and 0 is oxygen; and platinum.

9. A process according to claim 4 wherein the loading of metal electrocatalyst anode and cathode on said electrolyte is about 0.01 to about 1 mg/cm$^2$.

10. A process according to claim 4 wherein said process is carried out at about 750° to about 800° C.

11. A process for concurrent gas phase electrocatalytic oxidative dimerization of methane at the anode on one side of a solid electrolyte and reduction of carbon dioxide to gaseous hydrocarbons at a cathode on the other side of said solid electrolyte, said process comprising:
    passing methane containing gas in contact with one side of a rare earth metallic oxide anode layer in contact on its other side with one side of an electronic conducting and proton mediating metallic oxide perovskite anode layer in contact with one side of a solid electrolyte on its opposite side catalytically oxidatively dimerizing said methane to C$_2$ species and forming proton mediating ions;
    transferring formed proton mediating ions to and through a proton mediating solid electrolyte to a cathode contacting the other side of said solid electrolyte;
    passing carbon dioxide containing gas in contact with one side of an electronic conducting and proton mediating metallic cathode selected from the group consisting of a rare earth metallic oxide cathode layer in contact on its inner side with an electronic and ionic conducting perovskite cathode layer in contact with said solid electrolyte, said perovskite having copper partially substituted into lattice sites, copper, and copper alloys catalytically reducing said carbon dioxide to C$_2$ species; and
    withdrawing said C$_2$ species from the region of said cathode and said anode.

12. A process according to claim 11 wherein said rare earth metallic oxide anode layer is selected from the group consisting of Sm$_2$O$_3$, Dy$_2$O$_3$, Ho$_2$O$_3$, Yb$_2$O$_3$, Eu$_2$O$_3$, Er$_2$O$_3$, Lu$_2$O$_3$, Gd$_2$O$_3$, and Tm$_2$O$_3$ and said perovskite anode layer is selected from the group consisting of having the general formula AMO$_3$ where A is selected from the group consisting of La and Pr, M is selected from the group consisting of Co, Ni, and Mn, and O is oxygen; compounds having the general formula La$_{1-x}$Ma$_x$MbO$_3$ where La is lanthanum, Ma is selected from the group consisting of Sr, Ca, K, and Pr, Mb is selected from the group consisting of Cr, Mn, Fe, Co, and Ba, x is a number about 0.01 to about 0.2, and O is oxygen; compounds having the general formula LaMcO$_3$ where La is lanthanum, Mc is selected from the group consisting of Ni, Co, Mn, Fe, and V, and 0 is oxygen; and platinum.

13. A process according to claim 11 wherein said solid electrolyte is selected from the group consisting of BaCeO$_3$ materials doped with a material selected from the group consisting of Yb, Y, Gd, Nd, La and Ca; Yb-doped SrCeO$_3$ and perovskite structured KTaO$_3$ crystals.

14. A process according to claim 11 wherein said pervoskite cathode layer has the general formula AMO$_3$ where A is selected from the group consisting of La and Pr, M is selected from the group consisting of Co, Ni, and Mn, and 0 is oxygen, said perovskite having partial substitution of copper into M lattice sites.

15. A process according to claim 11 wherein said cathode is selected from the group consisting of copper and copper alloys.

16. A process according to claim 11 wherein the loading of metal electrocatalyst anode and cathode on said electrolyte is about 0.01 to about 1 mg/cm$^2$.

17. A process according to claim 11 wherein said process is carried out at about 800° to about 1020° C.

18. An electrochemical cell for concurrent gas phase electrocatalytic oxidative dimerization of methane at the anode on one side of a solid electrolyte and reduction of carbon dioxide to gaseous hydrocarbons at a cathode on the other side of said solid electrolyte, said electrochemical cell comprising:
    an anode comprising a rare earth metallic oxide anode layer in contact with one side of an ionic and electronic conducting metallic oxide perovskite anode layer in contact with one side of a solid electrolyte on its opposite side, said anode catalytically oxidatively dimerizing said methane to C$_2$ species;
    means for passing methane containing gas in contact with said rare earth metallic oxide anode layer;
    a cathode comprising an ionic and electronic conducting metal cathode electrocatalyst capable of providing adsorption sites for carbon dioxide an chemisorbed and Faradaically generated hydrogen species in proximity to said adsorbed carbon dioxide and capable of catalytic reduction of said carbon dioxide to predominantly C$_2$ species;
    means for passing carbon dioxide containing gas in contact with one side of said cathode;
    a solid electrolyte capable of transferring an ionic species selected from the group consisting of an O$^{2-}$ species from said cathode to said anode and a proton mediating ion from said anode to said cathode at cell operating temperatures; and
    means for withdrawing said C$_2$ species from the region of both said anode and said cathode.

19. An electrochemical cell according to claim 18 wherein said metallic oxide anode layer is selected from the group consisting of Sm$_2$O$_3$m, Dy$_2$O$_3$, Ho$_2$O$_3$, Yb$_2$O$_3$, Nd$_2$O$_3$, Eu$_2$O$_3$, Er$_2$O$_3$, Lu$_2$O$_3$, Gd$_2$O$_3$, and Tm$_2$O$_3$, and said perovskite anode layer is selected from the group consisting of having the general formula AMO$_3$ where A is selected from the group consisting of La and Pr, M is selected from the group consisting of Co, Ni, and Mn, and 0 is oxygen; compounds having the general formula La$_{1-x}$Ma$_x$MbO$_3$ where La is lanthanum, Ma is selected from the group consisting of Sr, Ca, K, and Pr, Mb is selected from the group consisting of Cr, Mn, Fe, Co, and Ba, x is a number about 0.01 to about 0.2, and O is oxygen; compounds having the general formula LaMcO$_3$ where La is lanthanum, Mc is selected from the group consisting of Ni, Co, Mn, Fe, and V, and 0 is oxygen; and platinum.

20. An electrochemical cell according to claim 18 wherein said cathode comprises a rare earth metallic oxide cathode layer and an electronic and oxygen vacancy conducting perovskite cathode layer, said rare earth metallic oxide selected from the group consisting of Sm$_2$O$_3$, Dy$_2$O$_3$, Ho$_2$O$_3$, Yb$_2$O$_3$, Nd$_2$O$_3$, Er$_2$O$_3$, Lu$_2$O$_3$, Gd$_2$O$_3$, and Tm$_2$O$_3$, and said perovskite cathode layer selected from the group consisting of compounds having the general formula AMO$_3$ where A is selected from the group consisting of La and Pr, M is selected from the group consisting of Co, Ni, and Mn, and O is oxygen; compounds having the general formula $La_{1-x}Ma_xMbO_3$ where La is lanthanum, Ma is selected from the group consisting of Sr, Ca, K, and Pr, Mb is selected from the group consisting of Cr, Mn, Fe, Co, and Ba, x is a number about 0.01 to about 0.2, and O is oxygen; compounds having the general formula $LaMcO_3$ where La is lanthanum, Mc is selected from the group consisting of Ni, Co, Mn, Fe, and V, and O is oxygen; and the above metallic oxide perovskite materials with copper introduced into a perovskite site.

21. An electrochemical cell according to claim 18 wherein said cathode is selected from the group consisting of copper and copper alloy.

22. An electrochemical cell according to claim 18 wherein said electrolyte is capable of transferring $O^{2-}$ ions and is selected from the group consisting of binary $ZrO_2$ based materials having the general formulas $Zr_{1-x}M^{2+}O_{2-x}$ and $Zr_{1-x}M^{3+}O_{2-x/2}$, and ternary $ZrO_2$ based materials $ZrO—Y_2O_3—Ta_2O_5$, $ZrO_2—Yb_2O_3—Yb_2O_3—MO_2$, where M is selected from the group consisting of Ca, Mg, Y, La, Nd, Sm, Gd, Yb, Lu, Sc, and Ho, and M comprises from about 5 m/o to about 20 m/o; and $ThO_2$ based materials having the general formulas $Th_{1-x}M^{2+}O_{2-x}$ and $Th_{1-x}M^{3+}O_{2-x/x}$, where M is selected from the group consisting of Ca, Y, Yb, Gd, and La, and M comprises about 5 m/o to 25 m/o.

23. An electrochemical cell according to claim 18 wherein said electrolyte is capable of transferring proton mediating ions and is selected from the group consisting of $BaCeO_3$ materials doped with a material selected from the group consisting of Yb, Y, Gd, Nd, La and Ca; Yb-doped $SrCeO_3$ and perovskite structured $KTaO_3$ crystals.

24. An electrochemical cell according to claim 18 wherein said cathode is selected from the group consisting of a rare earth metallic oxide cathode layer in contact on its inner side with an electronic and ionic conducting perovskite cathode layer in contact with said solid electrolyte, said perovskite having copper partially substituted into lattice sites, copper, and copper alloys.

25. An electrochemical cell according to claim 24 wherein said pervoskite cathode layer has the general formula $AMO_3$ where A is selected from the group consisting of La and Pr, M is selected from the group consisting of Co, Ni, and Mn, and O is oxygen, said perovskite having partial substitution of copper into M lattice sites.

26. An electrochemical cell according to claim 18 wherein said cathode is selected from the group consisting of copper and copper alloys.

27. An electrochemical cell according to claim 18 wherein the loading of metal electrocatalyst anode and cathode on said electrolyte is about 0.01 to about 1 $mg/cm^2$.

* * * * *